US008469073B2

(12) United States Patent
Hong et al.

(10) Patent No.: US 8,469,073 B2
(45) Date of Patent: Jun. 25, 2013

(54) AUTOMATIC SPACERS MOUNTING SYSTEM FOR FIELD EMISSION DISPLAY AND METHOD OF AUTOMATICALLY MOUNTING SPACERS

(75) Inventors: Jin-uk Hong, Hwaseong-si (KR); Kyung-do Park, Hwaseong-si (KR); Kyu-ho Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

(21) Appl. No.: 13/209,939

(22) Filed: Aug. 15, 2011

(65) Prior Publication Data

US 2012/0175036 A1 Jul. 12, 2012

(30) Foreign Application Priority Data

Jan. 7, 2011 (KR) ........................ 10-2011-0001935

(51) Int. Cl.
*B32B 37/12* (2006.01)

(52) U.S. Cl.
USPC ................ 156/539; 156/297; 445/24; 445/66

(58) Field of Classification Search
USPC ............................... 156/297, 539; 445/24, 66
See application file for complete search history.

(56) References Cited

U.S. PATENT DOCUMENTS

| | | | | |
|---|---|---|---|---|
| 5,337,893 | A * | 8/1994 | Nami et al. | 206/722 |
| 5,383,997 | A * | 1/1995 | Minowa et al. | 156/235 |
| 5,789,857 | A | 8/1998 | Yamaura et al. | |
| 5,984,079 | A * | 11/1999 | Garcia | 198/397.02 |
| 6,068,532 | A * | 5/2000 | Lai et al. | 445/24 |
| 6,119,927 | A * | 9/2000 | Ramos et al. | 228/254 |
| 8,152,582 | B2 * | 4/2012 | Nagasaka et al. | 445/24 |
| 2007/0044908 | A1 * | 3/2007 | Chan et al. | 156/297 |

FOREIGN PATENT DOCUMENTS

| | | | |
|---|---|---|---|
| EP | 2477205 | A2 | 7/2012 |
| JP | 200263859 | A | 2/2002 |
| JP | 2004319452 | A | 11/2004 |

OTHER PUBLICATIONS

Communication dated Jan. 9, 2013 issued by the European Patent Office in counterpart European Application No. 11185213.3.

* cited by examiner

*Primary Examiner* — Katarzyna Wyrozebski Lee
*Assistant Examiner* — John Blades
(74) *Attorney, Agent, or Firm* — Sughrue Mion, PLLC

(57) ABSTRACT

An automatic spacers mounting system includes a horizontal arraying pallet to hold spacers therein in a horizontal direction; a posture changing pallet and a shutter. The posture changing pallet and the shutter are coupled to the horizontal arraying pallet, such that the posture changing pallet faces the horizontal arraying pallet, and are rotated by 180 degrees with the horizontal arraying pallet. An inserting guide having a plurality of guiding holes is positioned above a panel having sprayed glue thereon is placed. The posture changing pallet and the shutter are disposed above the inserting guide, the plurality of spacers are inserted into the plurality of guiding holes, and a plurality of pressing pins of a pressing chuck are inserted in the guiding holes and press the spacers against the panel.

19 Claims, 15 Drawing Sheets

AUTOMATIC SPACERS MOUNTING SYSTEM FOR FIELD EMISSION DISPLAY AND METHOD OF AUTOMATICALLY MOUNTING SPACERS

CROSS-REFERENCE TO RELATED APPLICATION

This application claims priority under 35 U.S.C. §119(a) from Korean Patent Application No. 2011-0001935 filed Jan. 7, 2011 in the Korean Intellectual Property Office, the disclosure of which is incorporated herein by reference in its entirety.

BACKGROUND

1. Field

Apparatuses and methods consistent with exemplary embodiments relate to a field emission display, and more particularly, to an automatic spacers mounting system capable of automatically mounting spacers on a panel of a field emission display.

2. Description of the Related Art

Generally, a field emission display (FED) has a top panel and a bottom panel that are spaced apart from each other, and a space between the top and bottom panels is sealed in a vacuum. Therefore, many spacers are used to uniformly maintain the gap and the vacuum between the top and bottom panels.

Field emission displays having displays of 40-inches or larger use more than 1000 spacers to maintain structural stability and product characteristics. A spacer may have a cylindrical shape.

A method of mounting spacers on the field emission display may include a worker individually mounting spacers on the field emission display with tweezers. The method takes a long time and provides a low yield.

In another method, a plurality of spacers are picked up and placed by a chuck. When L×M spacers are mounted on a panel of a field emission display, the method is configured so that L spacers are mounted on the panel M times. Accordingly, many spacers are set in a vertical position one by one using a bowl feeder and a linear feeder, and a gripper is used to pick up and place the spacers to mount them on the field emission display. However, since the number of spacers that can be picked up and placed by the gripper at one time is small, this method takes a long time. Also, if the spacers have a high aspect ratio, it is difficult to quickly mount the spacers.

SUMMARY

One or more embodiments may overcome the above drawbacks and other problems associated with the related art arrangement. One or more embodiments provide an automatic spacers mounting system capable of mounting many spacers having a high aspect ratio on a panel at a high speed and a mounting method using the same.

In accordance with an aspect of an exemplary embodiment, there is provided an automatic spacers mounting system, including a horizontal arraying device configured to hole a plurality of spacers in a horizontal arraying pallet in a horizontal direction; a reversing device including a posture changing pallet and an open-close shutter in a layered structure. The reversing device couples the horizontal arraying pallet to the posture changing pallet such that the posture changing pallet faces the horizontal arraying pallet, and rotates the posture changing pallet by 180 degrees with the coupled horizontal arraying pallet. An inserting guide having a plurality of guiding holes is disposed above a panel with sprayed glue disposed on a working table. A first loader carries the reversing device above the inserting guide and inserts the plurality of spacers into the plurality of guiding holes. A pressing chuck includes a plurality of pressing pins to be inserted in the plurality of guiding holes and to press the spacers against the panel. A second loader carries the pressing chuck above the inserting guide and inserts the plurality of pressing pins into the plurality of guiding holes; and a controller controls the reversing device, the first loader and the second loader to mount the plurality of spacers on the panel.

The horizontal arraying pallet may include a plurality of elongated grooves formed at a predetermined interval and in which the plurality of spacers is horizontally inserted.

The horizontal arraying device may be configured to allow the horizontal arraying pallet to perform a seesaw motion and to apply vibration to the horizontal arraying pallet.

The reversing device may include a reversing frame in which the posture changing pallet and the open-close shutter are layered; and a rotating unit to rotate the reversing frame.

The reversing frame may include pallet fixing portions to fix the horizontal arraying pallet to the posture changing pallet and a shutter driving portion to move the open-close shutter with respect to the posture changing pallet.

The posture changing pallet may include a plurality of posture changing holes. Each of the posture changing holes may include an inlet portion corresponding to the spacer in a horizontal state, an outlet portion corresponding to the spacer in a vertical state and a curved portion connecting the inlet portion and the outlet portion to guide the spacer from the horizontal state to the vertical state.

The open-close shutter may include a plurality of blocking portions formed to correspond to the outlet portions of the plurality of posture changing holes of the posture changing pallet and a plurality of through holes, each formed at a side of one of the plurality of blocking portions, the plurality of through holes being holes which the spacers discharged from the outlet portion passes. According to a signal form the controller, the blocking portion or the through holes may be located below the outlet portions of the posture changing holes.

A top end of each of the plurality of guiding holes of the inserting guide may be funnel-shaped.

Each of the plurality of pressing pins may be a spring pin.

The horizontal arraying pallet may be configured to array a number of spacers corresponding to a number of spacers that will be mounted on the panel at one time. The panel may be divided into four equal parts and the controller may mount ¼ of the spacers on each of the four equal parts at a time.

The automatic spacers mounting system may include a panel carrying unit to automatically load and unload the panel to and from the working table.

The automatic spacers mounting system may include a glue dispensing apparatus disposed at a side of the panel carrying unit to spray glue onto a plurality of positions of the panel on which the plurality of spacers is to be mounted.

In accordance with an aspect of another exemplary embodiment, a method of automatically mounting spacers may include; spraying glue onto a plurality of positions on a panel on which a plurality of spacers is to be mounted; loading the panel with sprayed glue onto a working table below an inserting guide of an automatic spacers mounting apparatus; arraying the plurality of spacers on a horizontal arraying pallet in a horizontal direction using a horizontal arraying device; coupling the horizontal arraying pallet to a posture changing pallet of a reversing device; allowing the reversing device to rotate by 180 degrees so that the plurality of spacers is moved into vertical positions; moving the reversing device above the inserting guide; allowing the plurality of spacers to fall into a plurality of guiding holes of the inserting guide so that the spacers inserted into the plurality of guiding holes of the inserting guide contact the glue on the panel; moving a pressing chuck above the inserting guide to press the spacers inserted in the guiding holes; and unloading the panel after separating the pressing chuck from the inserting guide The spraying glue onto the plurality of positions of the panel and the arraying the plurality of spacers on the horizontal arraying pallet may be simultaneously performed.

When the reversing device rotates the horizontal arraying pallet by 180 degrees, the position of each of the spacers is changed from a horizontal position to a vertical position while the spacers pass through a plurality of posture changing holes of the posture changing pallet.

The inserting guide may be divided into four equal parts, and the moving the reversing device above the inserting guide may comprise placing the reversing device in order above a first part to a fourth part of the inserting guide.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION OF THE EXEMPLARY EMBODIMENTS

Figure 1:
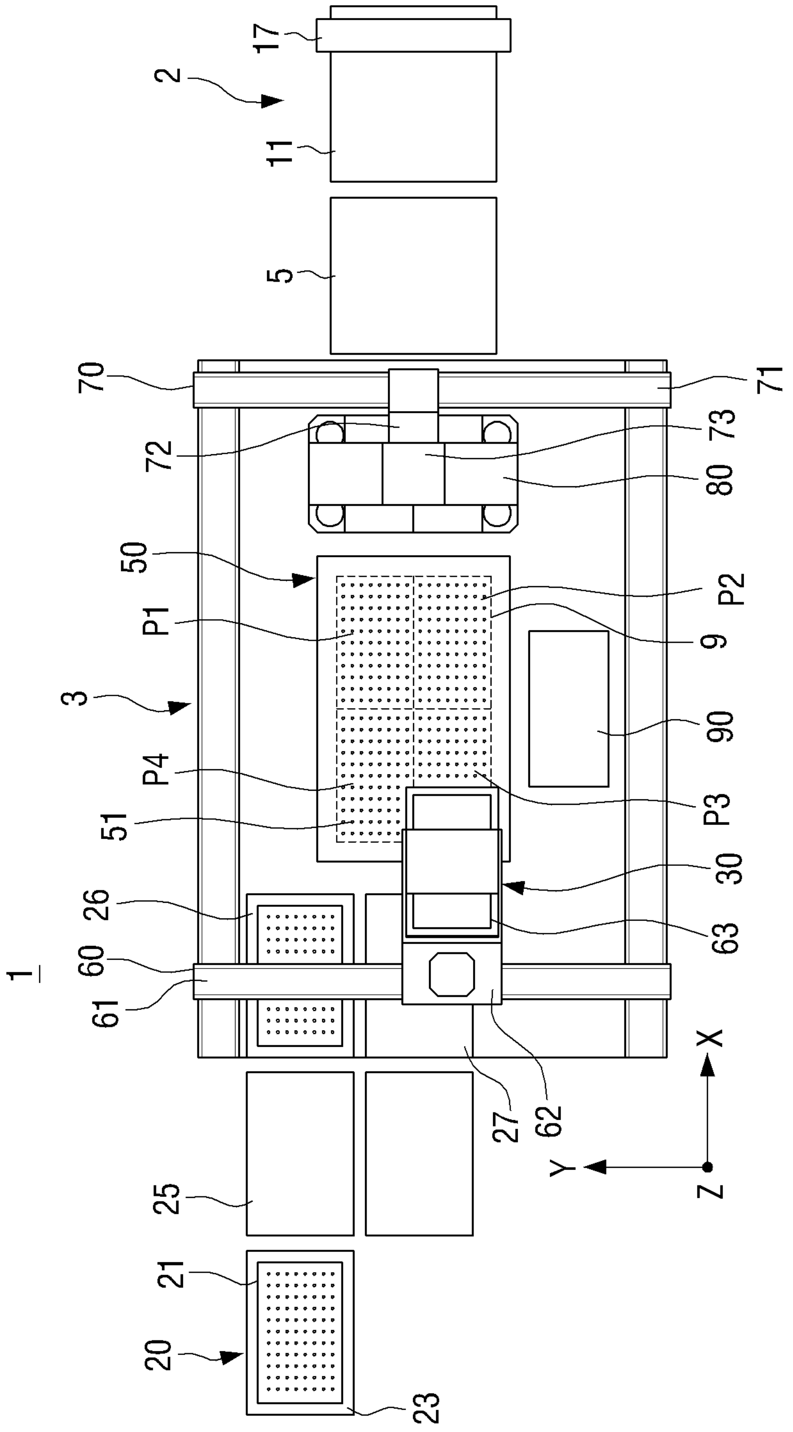
FIG. 1 is a layout schematically illustrating an automatic spacers mounting system according to an exemplary embodiment.

Hereinafter, certain exemplary embodiments will be described in detail with reference to the accompanying drawings. Throughout the drawings, like reference numerals will be understood to refer to like parts, components and structures.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

Figure 2:
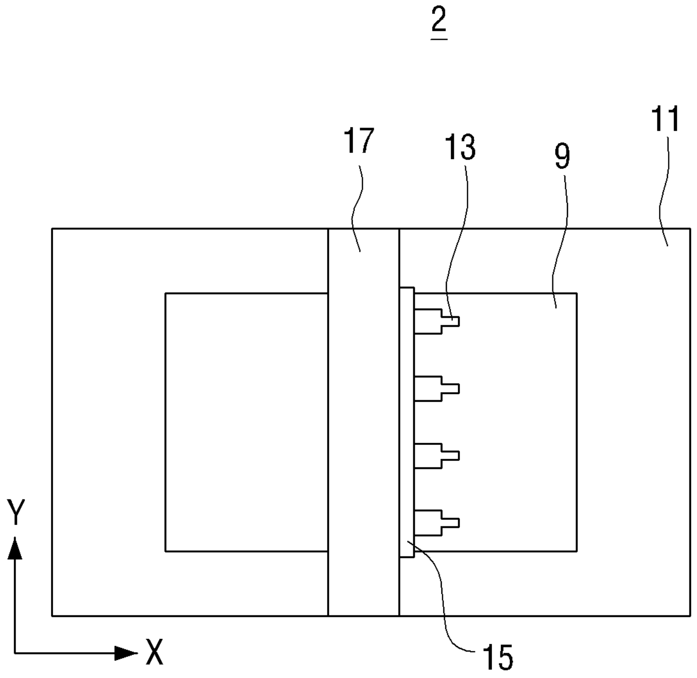
FIG. 2 is a conceptual view illustrating a glue dispensing apparatus used in an automatic spacers mounting system according to an exemplary embodiment.

FIG. 1 is a layout schematically illustrating an automatic spacers mounting system according to an exemplary embodiment, and FIG. 2 is a conceptual view illustrating a glue dispensing apparatus used in an automatic spacers mounting system according to an exemplary embodiment.

The automatic spacers mounting system 1 is an apparatus that automatically mounts a number of spacers S on a panel 9 of an FED, and, as illustrated in FIG. 1, may include a glue dispensing apparatus 2 and a automatic spacers mounting apparatus 3.

The glue dispensing apparatus 2 is an apparatus that dispenses a predetermined amount of glue at a plurality of positions on the panel 9 of the field emission display on which the spacers are to be mounted. In the case of a 46-inch panel, 1176 spacers are mounted on the panel. A conceptual view of the glue dispensing apparatus 2 is illustrated in FIG. 2.

Referring to FIG. 2, the glue dispensing apparatus 2 may include a base 11, a gun head 15 on which a plurality of glue guns 13 are disposed, and a gun moving unit 17 to move the gun head 15 with respect to the base 11.

Figure 3:
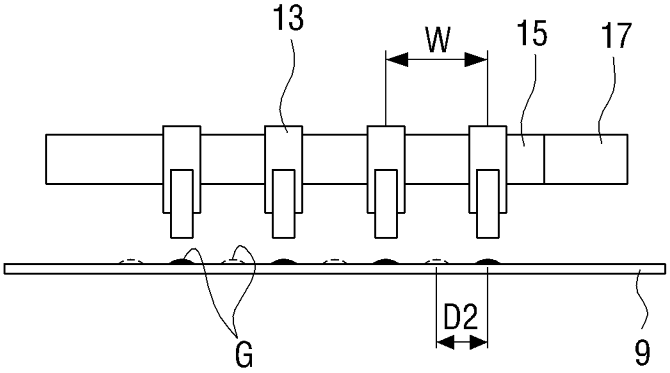
FIG. 3 is a view conceptually illustrating a state in which the glue dispensing apparatus of FIG. 2 dispenses glue on the panel.

The panel 9 is loaded on the base 11 of the glue dispensing apparatus 2. Although not illustrated, a panel loading apparatus may be included to automatically load and unload the panel 9 to and from the base 11 of the glue dispensing apparatus 2. The plurality of glue guns 13 are disposed at a predetermined interval on the gun head 15. FIG. 2 illustrates the glue dispensing apparatus 2 having four glue guns 13; however, this is only one example. The number of the glue guns 13 may be determined as necessary. Intervals between the plurality of glue guns 13 may be equal to a multiple of a pitch D2 between the plurality of spacers S that will be mounted on the panel 9. FIG. 3 illustrates a case in which the interval W between the glue guns 13 is two times of the pitch D2 between the spacers S. The gun moving unit 17 is formed to move the gun head 15 in two directions, namely, in an X direction and a Y direction with respect to the base 11. The glue guns 13 are upwardly spaced apart from the panel 9 by a predetermined distance and can spray a predetermined amount of glue in a dot on the panel 9. The amount of glue G sprayed by the glue gun 13 may be determined as the amount needed to fix the spacer S on the panel 9.

Figure 4:
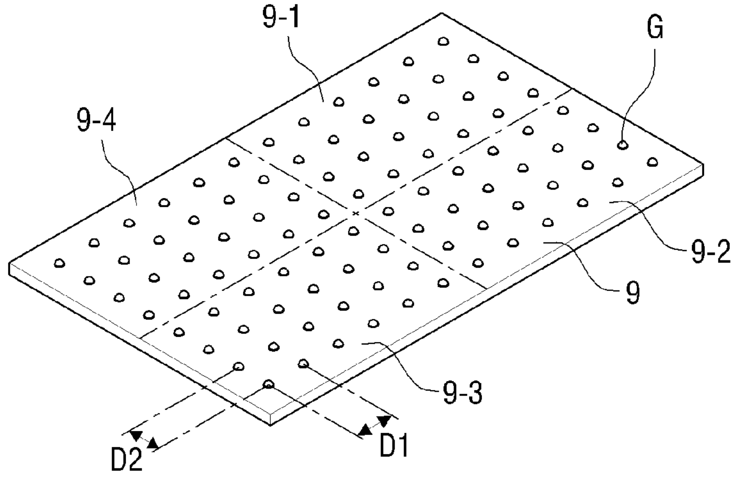
FIG. 4 is a perspective view illustrating the panel on which the glue is dispensed at a predetermined interval by the glue dispensing apparatus of FIG. 2.

The glue dispensing apparatus 2 divides the panel 9 into predetermined areas, moves the gun head 15, on which the plurality of glue guns 13 are disposed, in X and Y directions, and sprays the glue G in dots at positions at which the spacers S are mounted all over the panel 9. The sprayed glue, as illustrated in FIG. 4, forms a plurality of glue spots G on a top surface of the panel 9. The plurality of glue spots G are formed at the same intervals D1 and D2 in the X and Y directions as the pitches of the spacers S to be mounted. In FIG. 4, for convenience of drawing, only some glue spots G are enlarged and illustrated. In fact, 1176 glue spots G may be formed on a 46-inch panel 9. The plurality of glue guns 13 may be controlled by a trigger signal. The panel 9 on which the glue G is sprayed by the glue dispensing apparatus 2 is loaded onto the automatic spacers mounting apparatus 3 that will be described below.

Figure 5:
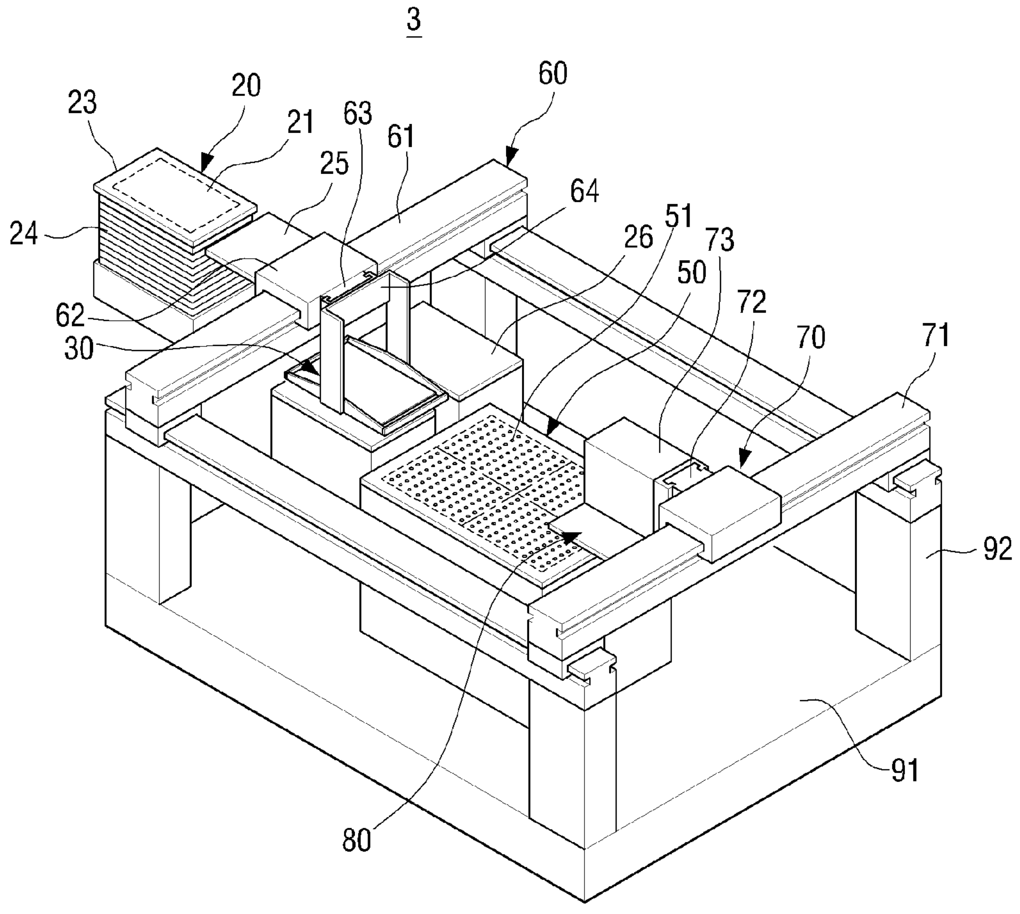
FIG. 5 is a perspective view schematically illustrating an automatic spacers mounting apparatus according to an exemplary embodiment.

FIG. 5 is a perspective view schematically illustrating the automatic spacers mounting apparatus 3 according to an exemplary embodiment.

Referring to FIG. 5, the automatic spacers mounting apparatus 3 may include a horizontal arraying device 20, a reversing device 30, an inserting guide 50, a working table 55 (FIG. 18), a first loader 60, a second loader 70, a pressing chuck 80, and a controller 90 (FIG. 1).

Figure 6:
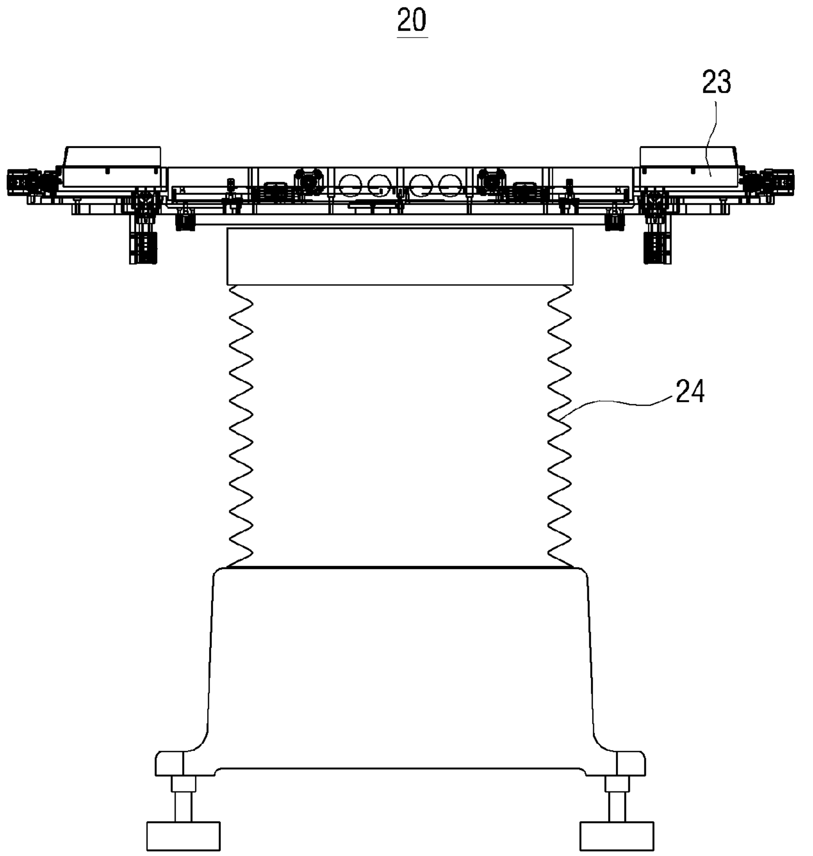
FIG. 6 is a perspective view illustrating a horizontal arraying device of the automatic spacers mounting system of FIG. 1.
Figure 7:
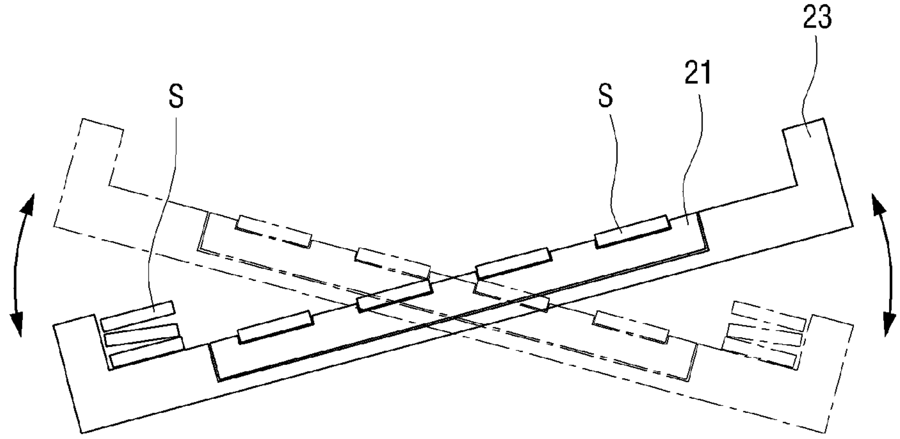
FIG. 7 is a view conceptually illustrating a state in which the horizontal arraying device of FIG. 6 arrays spacers.

The horizontal arraying device 20 is an apparatus that allows the plurality of spacers S to be arrayed in a horizontal direction on a horizontal arraying pallet 21. Referring to FIG. 6, the horizontal arraying device 20 includes a seesaw table 23 and an operating portion 24. On the seesaw table 23 is detachably mounted the horizontal arraying pallet 21. The operating portion 24 drives the seesaw table 23 to perform a seesaw motion as illustrated in FIG. 7. Also, the operating portion 24 can apply vibrations of a predetermined frequency to the seesaw table 23. Therefore, the horizontal arraying pallet 21 mounted on the seesaw table 23 can perform a seesaw motion, and simultaneously vibrate at a predetermined frequency.

Figure 10A:
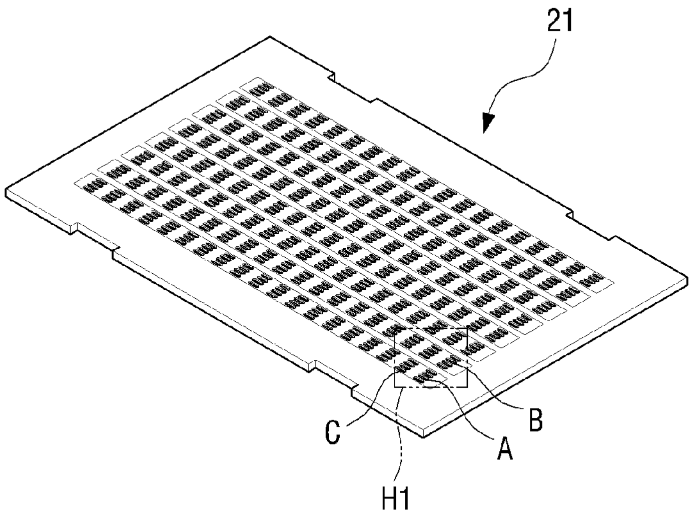
FIG. 10A is a perspective view illustrating the horizontal arraying pallet of FIG. 9.
Figure 10B:
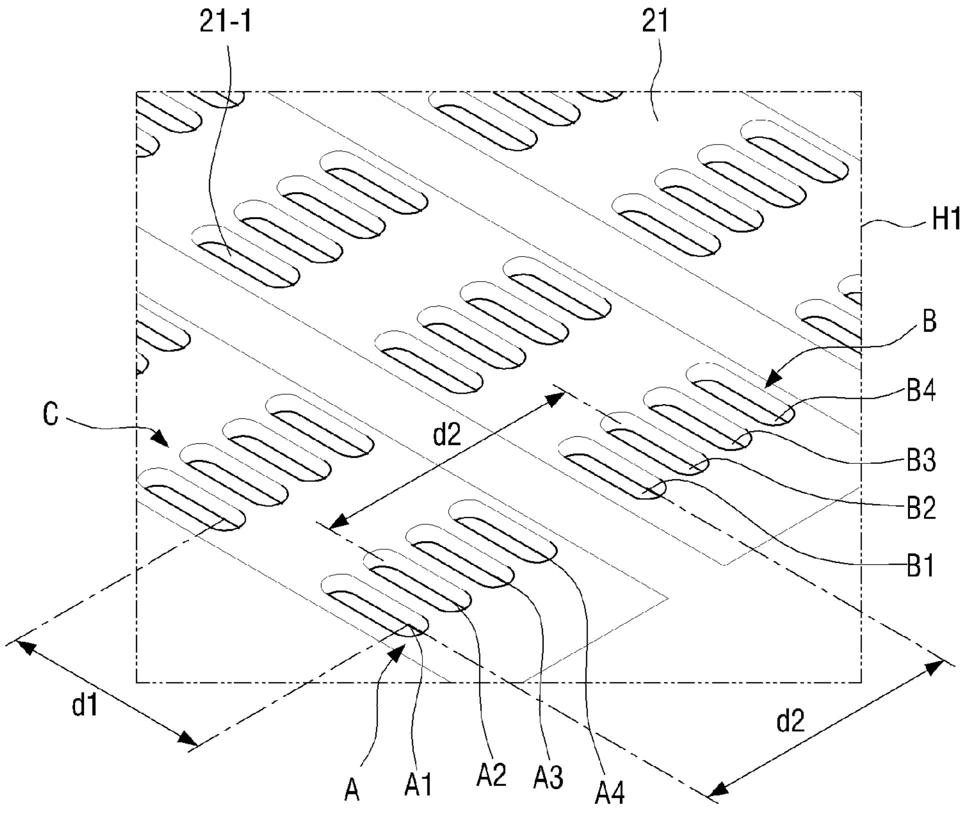
FIG. 10B is an enlarged perspective view illustrating a portion H1 of FIG. 10A.

One example of the horizontal arraying pallet 21 is illustrated in FIG. 10A. The horizontal arraying pallet 21 has a plurality of elongated grooves 21-1 in which a spacer S can be received in a horizontal state. In this embodiment, the horizontal arraying pallet 21 has a number of elongated grooves 21-1 corresponding to the number of spacers S, so that all of the spacers S required for the panel 9 can be received in the horizontal arraying pallet 21. When the spacers S have cylindrical shapes, the elongated grooves 21-1 may be formed to have cross-sections corresponding to the shape of the spacer S. The elongated grooves 21-1 are configured so that four elongated grooves 21-1 form one group. The four elongated grooves 21-1 of each of two nearby groups have the same interval as the pitch of plurality of spacers that will be mounted on the panel 9. In other words, referring to an enlarged view of a portion H1 illustrated in FIG. 10B, an interval d2 between a first elongated groove A1 among four elongated grooves A1-A4 of A group and a first elongated groove B1 among four elongated grooves B1-B4 of B group has the same size as that of a spacer pitch D2. In the same manner, an interval d2 between each of the second, third, and fourth elongated grooves A2, A3 and A4 of the A group and each of the second, third, and fourth elongated grooves B2, B3 and B4 of the B group is the same size as the spacer pitch D2. Also, an interval d1 between the A group and a C group perpendicular to the A group is the same size as that of a spacer pitch D1 in a corresponding direction. Here, the spacer pitch means intervals D1 and D2 (see FIG. 4) between spacers S in two directions that are perpendicular to each other when the spacers S are mounted on the panel 9. Also, the number of elongated groove groups A, B, and C formed on the horizontal arraying pallet 21 is ¼ of the total number of spacers S. Therefore, the horizontal arraying pallet 21 on which the elongated groove groups A, B and C are formed has an area corresponding to ¼ of an area of the panel 9.

A pallet carrying unit 25 may be disposed at a side of the horizontal arraying device 20. The pallet carrying unit 25 carries the horizontal arraying pallet 21 on which the spacers S are loaded to a pallet loading portion 26 below the first loader 60. The pallet carrying unit 25 may be a conveyor. In the horizontal arraying device 20 may be disposed a device (not illustrated) that automatically carries the horizontal arraying pallet 21 to the pallet carrying unit 25. The pallet carrying unit 25 places the horizontal arraying pallet 21 in the pallet loading portion 26.

Figure 8:
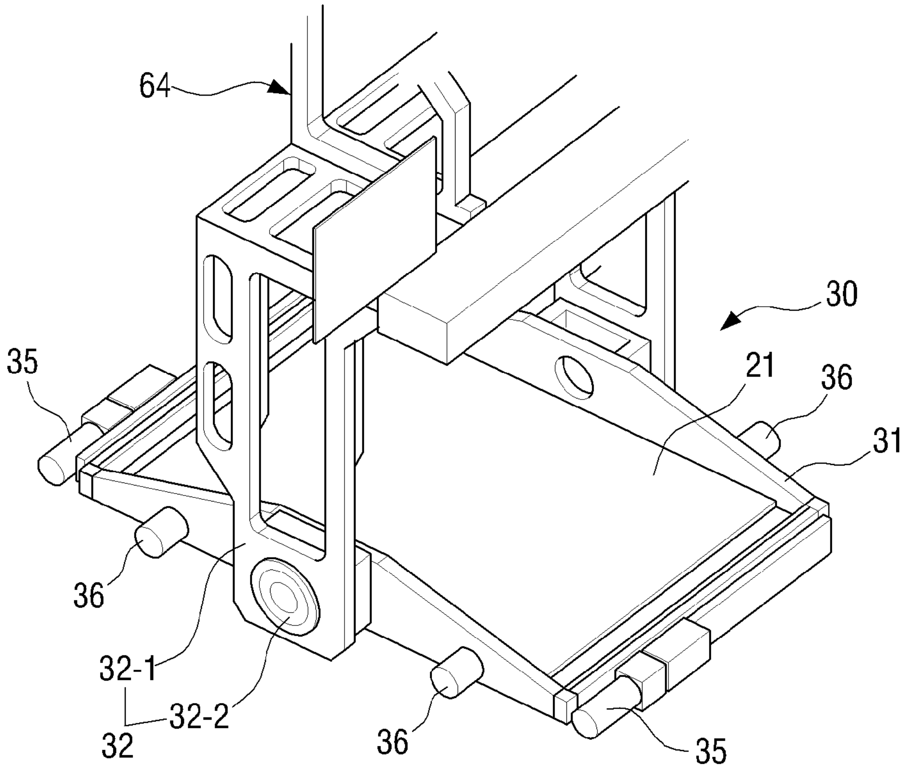
FIG. 8 is a perspective view illustrating a reversing device of the automatic spacers mounting system of FIG. 1.

FIG. 8 is a perspective view illustrating the reversing device 30 of the automatic spacers mounting system 1 according to an exemplary embodiment. The reversing device 30 is an apparatus that allows the plurality of spacers S arrayed horizontally to be arrayed vertically.

Figure 11A:
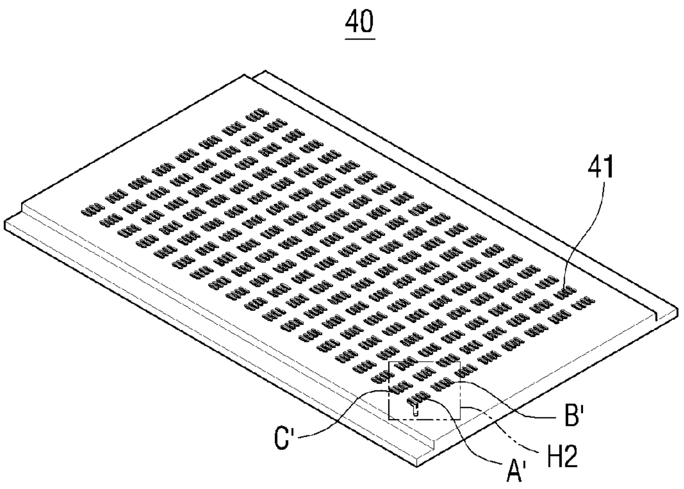
FIG. 11A is a perspective view illustrating a posture changing pallet of FIG. 9.
Figure 11B:
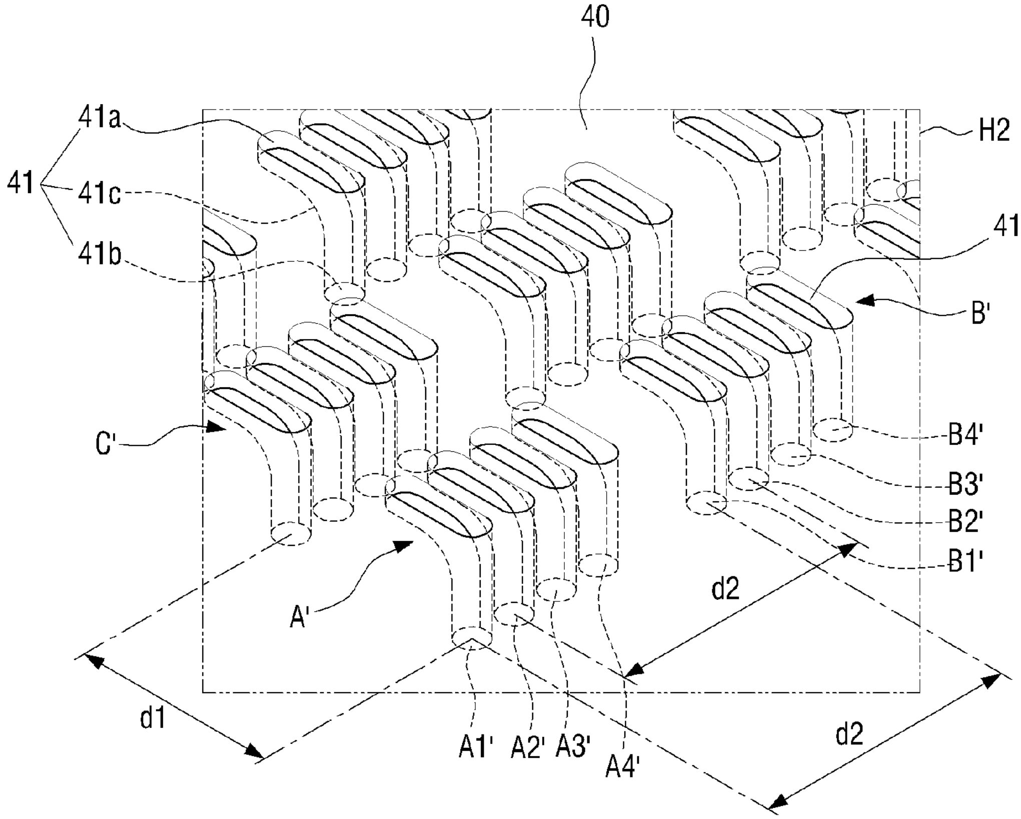
FIG. 11B is an enlarged perspective view illustrating a portion H2 of FIG. 11A.

Referring to FIG. 8, the reversing device 30 includes a reversing frame 31 and a rotating unit 32. The reversing frame 31 holds a posture changing pallet 40 on top of an open-close shutter 45. The posture changing pallet 40 has a size corresponding to the size of the horizontal arraying pallet 21, and has a plurality of posture changing holes 41 as illustrated in FIGS. 11A and 11B. The number of elongated grooves 21-1 formed in the horizontal arraying pallet 21 is the same as the number of the posture changing holes 41 formed in the posture changing pallet 40. In other words, in the posture changing pallet 40 are formed posture changing hole groups A', B' and C', each of which includes four posture changing holes A'1-A'4, corresponding to the elongated groove groups A, B and C of the horizontal arraying pallet 21. Therefore, the elongated grooves 21-1 of the horizontal arraying pallet 21 and the posture changing holes 41 of the posture changing pallet 40 correspond one to one.

Figure 17:
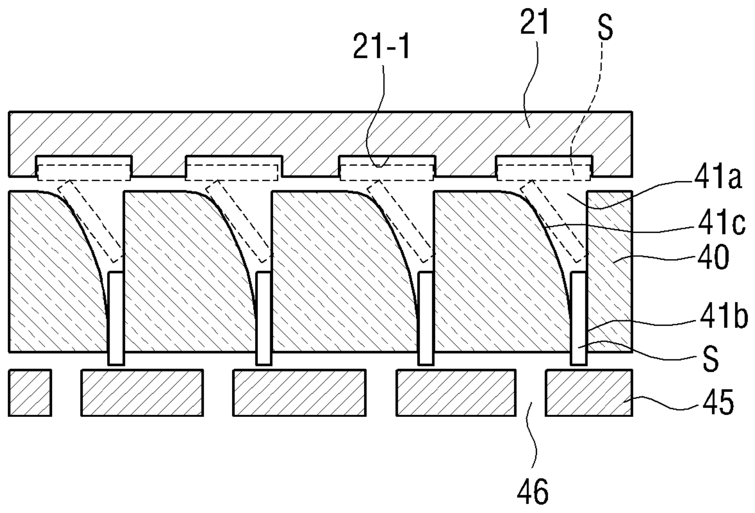
FIG. 17 is a partially sectional view conceptually illustrating a state in which the revering device of FIG. 16 is rotated by 180 degrees.

The posture changing holes 41, as illustrated in FIG. 17, allow the spacers S arrayed horizontally in the elongated grooves 21-1 of the horizontal arraying pallet 21 to be arrayed in a vertical direction. The posture changing holes 41, as illustrated in FIGS. 11B and 17, are configured to include an inlet portion 41*a* that corresponds to a size of the spacer S in a horizontal state to receive the spacer S in a horizontal state, a circular outlet portion 41*b* having an inner diameter through which the spacer S can pass, corresponding to the spacer S in a vertical state, and a curved portion 41*c* that connects the inlet portion and the outlet portion 41*b* and guides the spacer S to change its posture from a horizontal state to a vertical state. The curved portion 41*c* is formed to have a curvature sufficient to erect the falling spacer S from the horizontal state to a vertical state. Therefore, when the reversing device 30 rotates by 180 degrees, the spacers S which are disposed horizontally in the elongated grooves 21-1 of the horizontal arraying pallet 21 are moved into a vertical state while passing through the posture changing holes 41.

Figure 9:
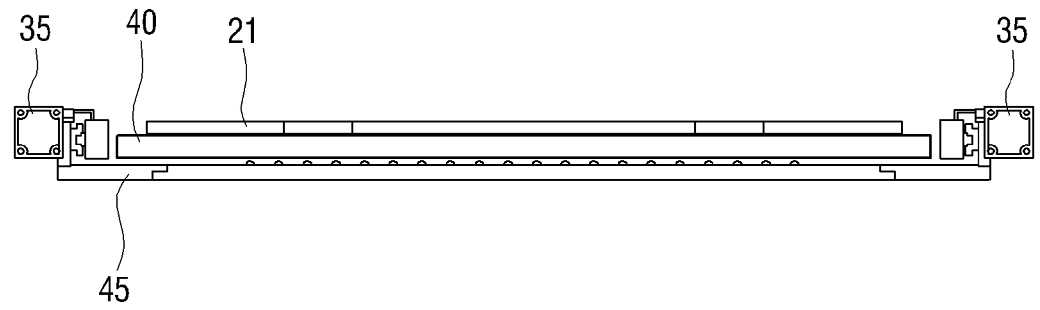
FIG. 9 is a sectional view illustrating a horizontal arraying pallet coupled to the reversing device of FIG. 8.

The posture changing pallet 40 and the open-close shutter 45 are layered as illustrated in FIG. 9. FIG. 9 illustrates a state in which the horizontal arraying pallet 21 has been connected to the posture changing pallet 40 and then rotated by 180 degrees. The posture changing pallet 40 is fixed to the reversing frame 31, and the open-close shutter 45 is disposed in the reversing frame 31 to face one surface of the posture changing pallet 40 and to position in at least five points with respect to the posture changing pallet 40. A shutter driving portion 35 that moves the open-close shutter 45 and determines a position of the open-close shutter 45 is disposed on opposite sides of the reversing frame 31. The shutter driving portion 35 may use a servo motor for accurate positioning. A moving distance of the open-close shutter 45 is determined to selectively open or close the posture changing holes 41 of the posture changing pallet 40. A surface opposite to the surface of the posture changing pallet 40 on which the open-close shutter 45 is disposed is exposed and is connected to the horizontal arraying pallet 21.

Figure 12A:
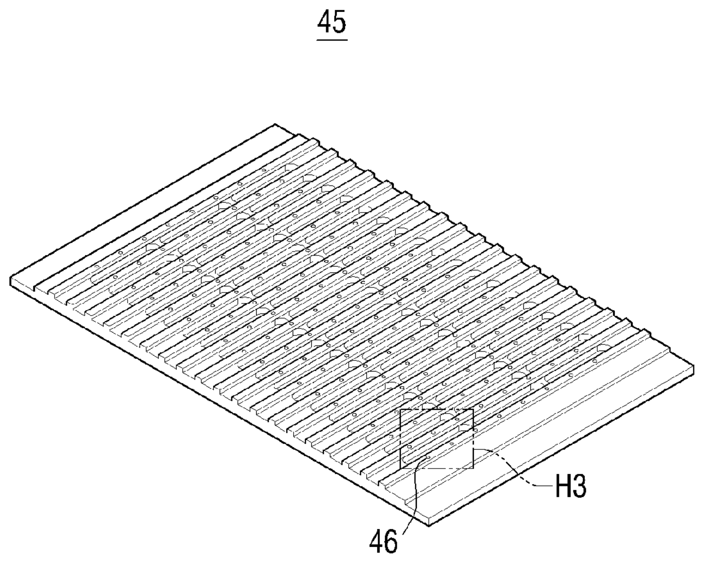
FIG. 12A is a perspective view illustrating a open-close shutter of FIG. 9.
Figure 12B:
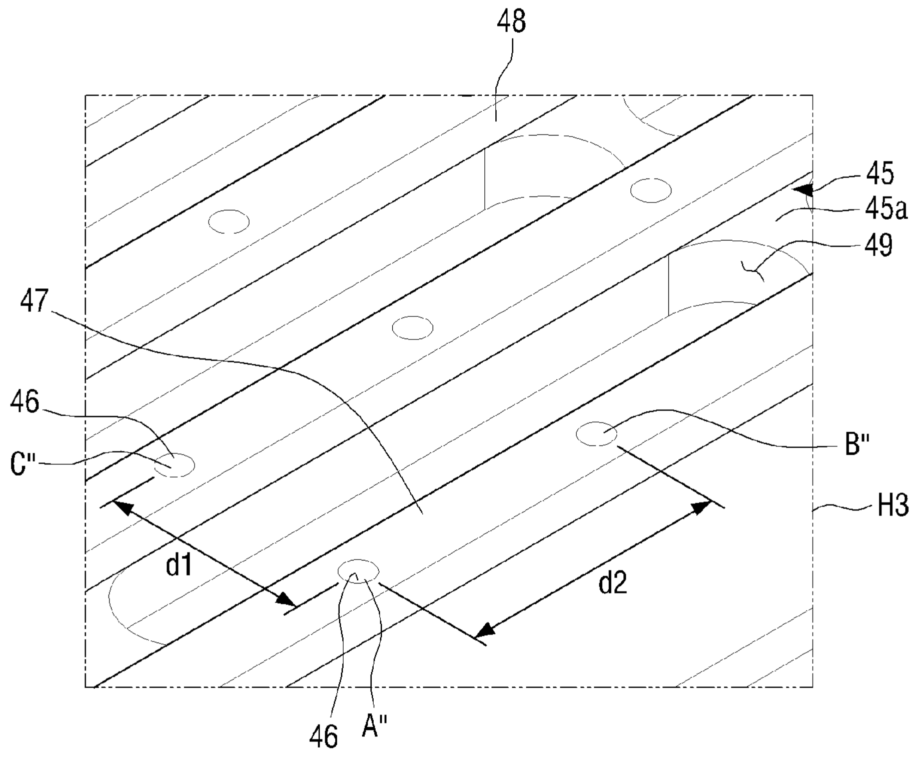
FIG. 12B is an enlarged perspective view illustrating a portion H3 of FIG. 12A.

The open-close shutter 45, as illustrated in FIGS. 12A and 12B, includes a plurality of through holes 46. Each of the through holes 46 is formed at a position corresponding to an outlet portion 41*b* of one of the four posture changing holes A'1, A'2, A'3 and A'4 of each of the plurality of posture changing hole groups A' and B' of the posture changing pallet 40. Therefore, the interval between two nearby through holes A" and B" in FIG. 12B corresponds to the interval between outlet portions 41*b* of two posture changing holes 41 corresponding to each other among nearby posture changing hole groups A' and B' of the posture changing pallet 40. For example, the interval d2 between two nearby through holes A" and B" of the open-close shutter 45 of FIG. 12B is the same as the interval d2 between two posture changing holes 41 in the same order of two nearby posture changing hole groups A' and B' of FIG. 11B. A blocking portion 47 which blocks the outlet portion of the posture changing holes 41 is provided between two nearby through holes A" and B" among the plurality of through holes 46. Therefore, when the through holes 46 of the open-close shutter 45 are aligned with the outlet portion 41*b* of the posture changing pallet 40, the spacer S can pass through the open-close shutter 45, and when the blocking portion 47 is disposed in front of the outlet portion 41*b*, the spacer S cannot pass through the open-close shutter 45. Also, as illustrated in FIG. 12B, the plurality of through holes 46 and the blocking portions 47 may be formed on portions 48 which project from a shutter plate 45*a* of the open-close shutter 45. Since friction between the open-close shutter 45 and the posture changing pallet 40 may be thereby decreased, the open-close shutter 45 can operate smoothly. Further, a plurality of openings 49 may be formed between projecting portions 48 of the open-close shutter 45. The plurality of openings 49 allows the leaked spacers S to be discharged so as to prevent the leaked spacers S from getting between the open-close shutter 45 and the posture changing pallet 40 and can reduce the weight of the open-close shutter 45.

Figure 13:
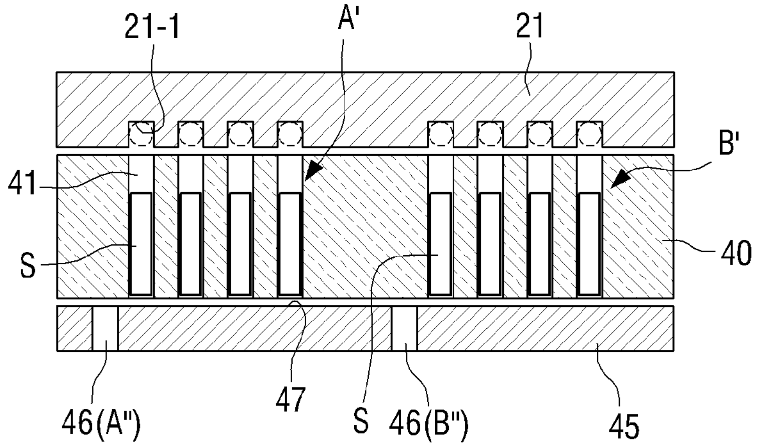
FIGS. 13 and 14 are a partially sectional view for explaining an operation of the open-close shutter of FIG. 12A.
Figure 14:
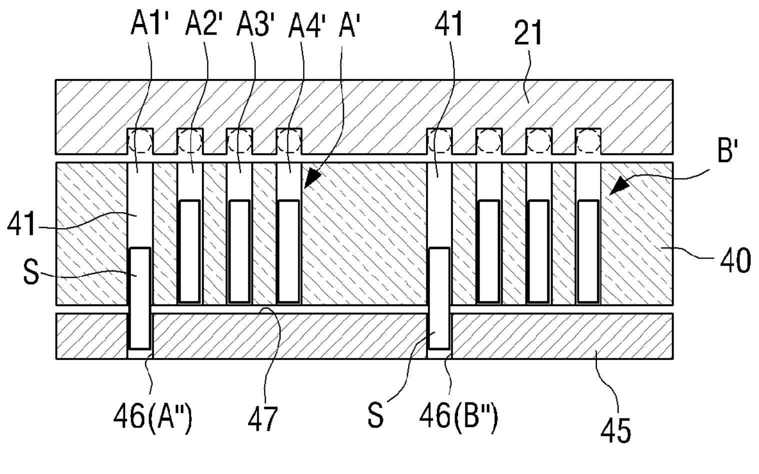

The open-close shutter 45 always blocks all the outlet portions 41*b* of the four posture changing holes 41 of the posture changing hole group of the posture changing pallet 40 before receiving a open signal from the controller 90. In other words, the open-close shutter 45, as illustrated in FIG. 13, is located in a first position (original position) in which the blocking portion 47 is disposed below the posture changing hole groups A' and B' of the posture changing pallet 40. When receiving a first open signal in this state, the open-close shutter 45, as illustrated in FIG. 14, moves to a second position in which the through hole 46 is disposed below the first posture changing hole A'1 of the posture changing hole group A'. Then, the spacer S that stands vertically at the outlet portion 41*b* of the first posture changing hole A'1 falls into a vertical state. At this time, the other three posture changing holes A'2, A'3 and A'4 are blocked by the blocking portion 47 so that the spacers S do not fall down. When the open-close shutter 45 receives a second open signal, the open-close shutter 45 moves to a third position in which the through hole 46 is disposed below a second posture changing hole A'2. Then the spacer S in the second posture changing hole A'2 falls and the other two posture changing holes A'3 and A'4 are blocked by the blocking portion 47 so that the spacers S do not fall down. When the open-close shutter 45 receives third and fourth open signals, the open-close shutter 45 moves to fourth and fifth positions in which the through hole 46 is disposed below the third posture changing holes A'3 and the fourth posture changing hole A'4, respectively, so that the spacers S fall down. After the open-close shutter 45 moves to the fifth position, the open-close shutter 45 again returns to the first position (the original position).

The rotating unit 32 rotates the reversing frame 31 by 180 degrees. Referring to FIG. 8, the rotating unit 32 is formed substantially in a '⊏' shape and includes a supporting frame 32-1 supporting a rotation of the reversing frame 31 and a rotating portion 32-2 that is disposed at a side of the supporting frame 32-1 and allows the reversing frame 31 to rotate. Various driving members can be used as the rotating portion 32-2 as long as they can rotate the reversing frame 31 by 180 degrees. Therefore, detailed explanations thereof will be omitted.

At opposite sides of the reversing frame 31 are disposed pallet fixing portions 36 that fix the horizontal arraying pallet 21 with respect to the posture changing pallet 40. In the embodiment illustrated in FIG. 8, four pallet fixing portions 36 are disposed at the reversing frame 31. Therefore, even when the reversing frame 31 rotates and moves, the horizontal arraying pallet 21 is not separated from the posture changing pallet 40.

The horizontal arraying pallet 21 and posture changing pallet 40 have the same size and each have a number of elongated grooves 21-1 and posture changing holes 41 corresponding to the spacers S required for the panel 9. In other words, if the panel 9 is divided into four equal parts 9-1, 9-2, 9-3 and 9-4, the horizontal arraying pallet 21 and the posture changing pallet 40 are formed to have a size corresponding to one part of the four equal parts 9-1, 9-2, 9-3 and 9-4 of the panel 9, namely, ¼ of the area of the panel 9. The open-close shutter 45 has approximately the same size as that of the posture changing pallet 40 and has the same number of through holes 46 as the number of spacers S mounted on one part of the four equal parts 9-1, 9-2, 9-3 and 9-4 of the panel 9. Therefore, all of the spacers S of the panel 9 received in the horizontal arraying pallet 21 can be mounted in order on the four equal parts 9-1, 9-2, 9-3 and 9-4 of the panel 9 by using the open-close shutter 45.

The size of each of the horizontal arraying pallet 21, the posture changing pallet 40, and the open-close shutter 45 may be properly determined in consideration of the size of the panel 9 and the automatic spacers mounting system 1. In this exemplary embodiment, a horizontal arraying pallet 21 having a size of approximately ¼ of the panel 9 is used for purposes of description. However, this is only one example and does not limit the size of the horizontal arraying pallet 21.

Figure 18:
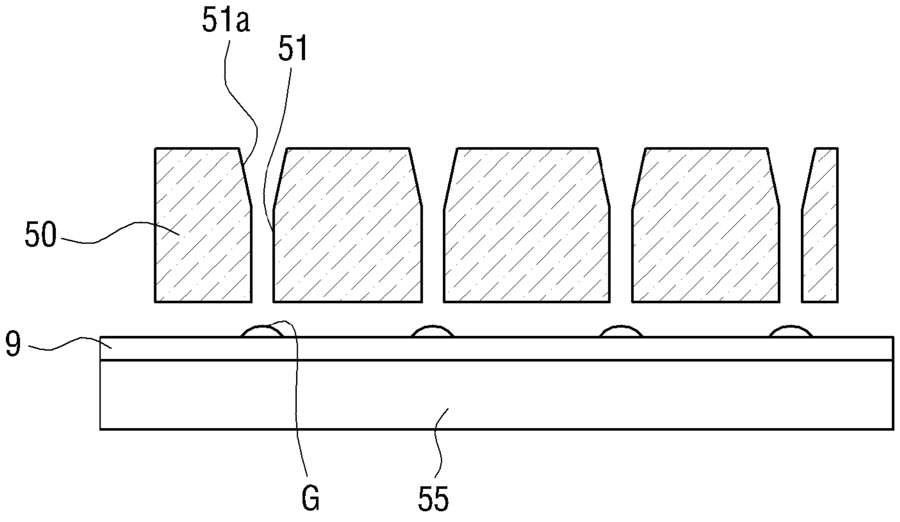
FIG. 18 is a partially sectional view conceptually illustrating a state in which a panel is loaded between a working table and an inserting guide.

The inserting guide 50 guides the spacer S falling from the posture changing pallet 40 to be placed on the panel 9 while maintaining a vertical posture, and is disposed at an approximate center of a main base 91. An inserting guide 50 is formed of a planar plate having a size corresponding to the total area of the panel 9. The inserting guide 50 has a plurality of guiding holes 51 of the same number as the number of spacers S that will be mounted on the panel 9 and at the same intervals as the spacer pitches D1 and D2. Therefore, after the panel 9 is loaded below the inserting guide 50, as illustrated in FIG. 18, the glue spot G sprayed on the panel 9 is located directly below the guiding hole 51. The guiding holes 51 have diameters which guide the spacers S and proper tolerance so that the spacer S is placed on the panel 9 accurately perpendicular and in an accurate position required by the panel 9. Also, for preventing the spacer S from becoming jammed, a top end of the guiding hole 51 may be funnel-shaped.

The working table 55 is disposed below the inserting guide 50 on the main base 91 to fix and support the panel 9. At a side of the working table 55 is disposed the panel carrying unit 5 that loads the panel 9 with the sprayed glue onto the working table 55 and unloads the panel 9, on which the spacers S are mounted, from the automatic spacers mounting apparatus 3. A conveyor, etc. may be used as the panel carrying unit 5.

The first loader 60 is disposed above the inserting guide 50 and is formed to move the reversing device 30 from the pallet loading portion 25 to above the inserting guide 50. Therefore, the first loader 60 may be formed as a three-axis Cartesian coordinate robot capable of moving in a straight line in each of three axis directions. In FIG. 1, the first loader 60 can move a first head 64 in an X direction, in a Y direction and in a Z direction (in a direction perpendicular to the paper surface in FIG. 1). The first loader 60 includes a first X axis unit 61 to move the first head 64 in the X direction, a first Y axis unit 61 to move the first head 64 in the Y direction and a first Z axis unit 61 to move the first head 64 in the Z direction. The rotating unit 32 of the reversing device 30 is fixed to the first head 64. The first loader 60 is supported by four poles 92 projecting from a top surface of the main base 91. Therefore, the first loader 60 can move the reversing device 30 from the pallet loading portion 26 to above the inserting guide 50 and lower the reversing device 30 so that the spacers S are inserted into the guiding holes 51 of the inserting guide 50. The structure and operation of the first loader 60 are similar to those of a three-axis Cartesian coordinate robot; therefore, detailed explanations thereof will be omitted.

The second loader 70 is disposed at a side of the first loader 60 above the inserting guide 50 and is supported by poles 92. The second loader 70 moves the pressing chuck 80 above the inserting guide 50 to correspond to a movement of the first loader 60. The second loader 70 may be a two axes loader or a three-axes loader. When the pressing chuck 80 has a size corresponding to half of the size of the inserting guide 50, that is, when the pressing chuck 80 is formed to press the spacers in half of the plurality of guiding holes 51, the pressing chuck 80 does not need to move in the Y direction. Therefore, the second loader 70 may be formed as a two-axis Cartesian coordinate robot. In this embodiment, since the pressing chuck 80 is formed to have a size corresponding to ½ of the size of the inserting guide 50, the second loader 70 is formed as a two-axis Cartesian coordinate robot capable of moving in a straight line in each of two-axis directions. In other words, referring to FIG. 1, the second loader 70 includes a second X axis unit 71 to move a second head 73 in the X direction and a second Z axis unit 72 to move the second head 73 in the Z direction perpendicular to the paper surface of FIG. 1. The pressing chuck 80 is disposed at the second head 73.

Figure 15:
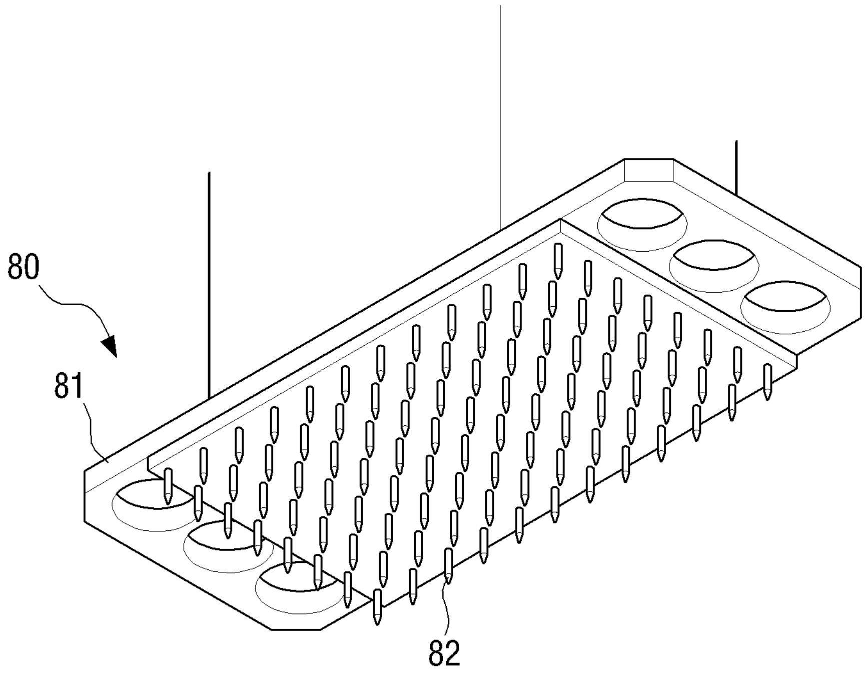
FIG. 15 is a perspective view illustrating a pressing chuck of the automatic spacers mounting system of FIG. 1.

The pressing chuck 80 presses spacers S inserted in the plurality of guiding holes 51 of the inserting guide 50, and, as illustrated in FIG. 15, includes a pressing plate 81 and a plurality of pressing pins 82 projecting from a bottom surface of the pressing plate 81. The pressing plate 81 may be formed to have a proper size as necessary. For example, the pressing plate 81 may be formed to press all of the spacers S of the panel 9 at once. Alternatively, the pressing plate 81 may be formed to press ½ or ¼ of the spacers S of the panel 9 at a time. In this embodiment, the pressing chuck 80 is formed to press ½ of the spacers S of the panel 9 at one time. Therefore, the pressing plate 81 has a size corresponding to approximately ½ of the size of the panel. On the bottom surface of the pressing plate 81 is formed a plurality of pressing pins 82 to press at one time a number of spacers S corresponding to ½ of the spacers S that will be placed on the panel 9. The pressing pins 82 may be formed of spring pins in order to press uniformly the plurality of spacers S.

The controller 90 is configured to control the reversing device 30, the first loader 60, the second loader 70, etc. The controller 90 may also control the horizontal arraying device 20, the pallet carrying unit 25, and the panel carrying unit 5. Therefore, when the horizontal arraying pallet 21 is located at the pallet loading portion 26, the controller 90 controls the first loader 60 to allow the reversing device 30 to be moved above the pallet loading portion 26 and to be coupled with the horizontal arraying pallet 21. Then, the controller 90 controls the reversing frame 31 of the reversing device 30 to rotate by 180 degrees and the reversing device 30 to move above the inserting guide 50. After that, the open-close shutter 45 is operated so that the plurality of spacers S falls into the plurality of guiding holes 51 of the inserting guide 50. Further, the controller 90 controls the second loader 70 so that the pressing chuck 80 presses the spacers S inserted in the guiding holes 51 of the inserting guide 50 to be attached to the glue G sprayed on the panel 9. After completing of mounting the spacers S, the controller 90 controls the panel carrying unit 5 to unload the panel 9 on which the spacers S are mounted from the automatic spacers mounting apparatus 3 and to load a new panel on which the glue G only is sprayed to the working table 55.

Figure 24:
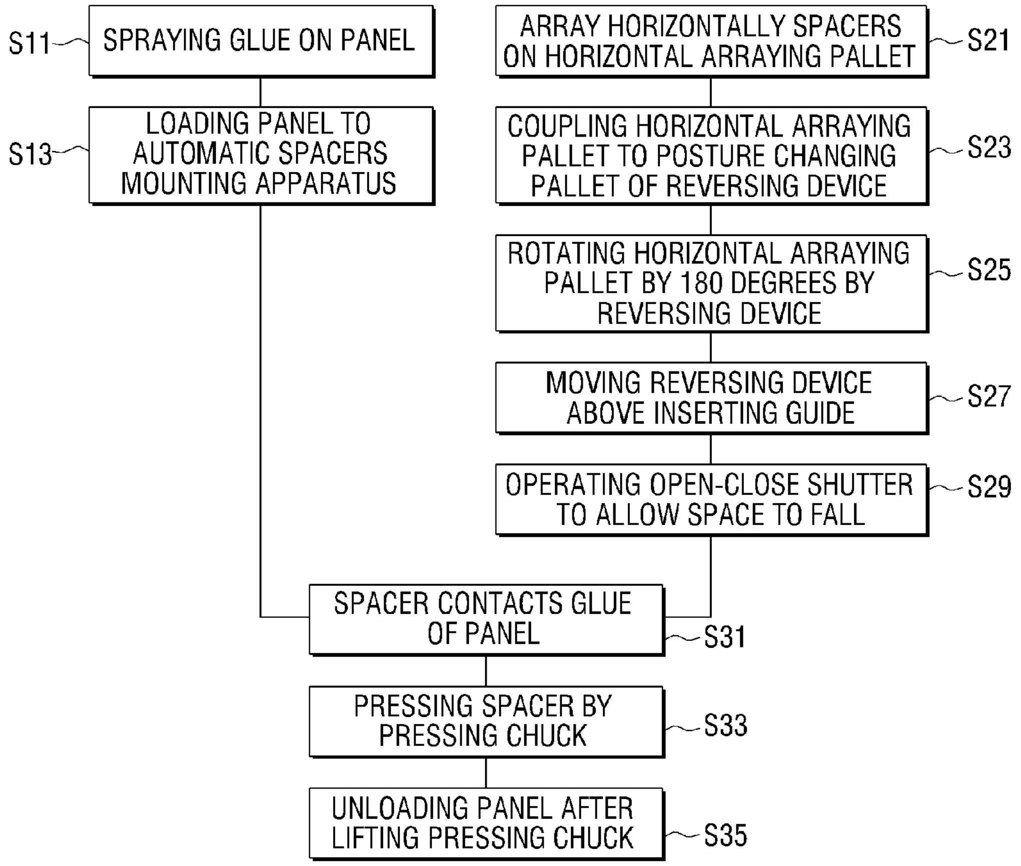
FIG. 24 is a flow chart illustrating a method of automatically mounting spacers according to an exemplary embodiment.

Hereinafter, operation of the automatic spacers mounting system 1 according to an exemplary embodiment will be explained in detail with reference to FIG. 24. In the below-described description, it is noted that although the controller 90 is not specifically described, control of all elements of the system may be performed by the controller 90.

First, glue G is sprayed on the panel 9 by using the glue dispensing apparatus 2 (S11). In other words, the panel 9 is loaded on the base 11 of the glue dispensing apparatus 2 illustrated in FIG. 2. After that, when operating the glue dispensing apparatus 2, the gun head 15 with the plurality of glue guns 13 is moved in the X and Y directions by the gun moving unit 17 to spray the glue G on the panel 9 in dots at intervals D1 and D2 at which the spacers S are to be mounted, thereby forming the plurality of glue spots G. After the spraying of the glue G is completed as illustrated in FIG. 4, the panel 9 is unloaded from the base 11 of the glue dispensing apparatus 2. At this time, if the panel loading apparatus (not illustrated) is disposed, the panel 9 may be automatically loaded to and unloaded from the base 11 of the glue dispensing apparatus 2 by the panel loading apparatus. After that, the panel 9 with sprayed glue G thereon is loaded onto the working table 55 below the inserting guide 50 of the automatic spacers mounting apparatus 3 (S13).

While spraying glue on the panel 9, as illustrated in FIG. 7, the plurality of spacers S may be horizontally arrayed in the horizontal arraying pallet 21 (S21). Since the horizontal arraying of the spacers S is performed in a different process and using a different apparatus from the glue dispensing apparatus 2 that is used in a process of spraying glue G, the horizontal arraying of the spacers S can be performed while spraying the glue G on the panel 9. The horizontal arraying of the spacers S is performed by using the horizontal arraying device 20. In other words, the horizontal arraying pallet 21 is mounted on the top surface of the seesaw table 23 of the horizontal arraying device 20. After that, while the spacers S are supplied to the horizontal arraying pallet 21, the horizontal arraying pallet 21 is allowed to perform a seesaw motion as illustrated in FIG. 7, and, at the same time, vibrations at a predetermined frequency are applied to the horizontal arraying pallet 21. Then, the spacers S are inserted into the plurality of elongated grooves 21-1 formed on the horizontal arraying pallet 21 to be arrayed in a horizontal state. In this embodiment, the horizontal arraying pallet 21 has a number of elongated grooves 21-1 corresponding to the number of the spacers S to be used in one panel 9 so as to array all spacers S that will be used in the one panel 9 at one time. Also, the horizontal arraying pallet 21 has a size corresponding to ¼ of the size of the panel 9. However, that the horizontal arraying pallet 21 has a size of ¼ of the size of the panel 9 is only one example; therefore, the horizontal arraying pallet 21 may alternately have the same size as that of the panel 9 or a size corresponding to ½ of the size of the panel 9.

The horizontal arraying pallet 21 receiving the horizontally arrayed spacers S is carried to the pallet loading portion 26 inside an operating range of the first loader 60 by the pallet carrying unit 25.

Figure 16:
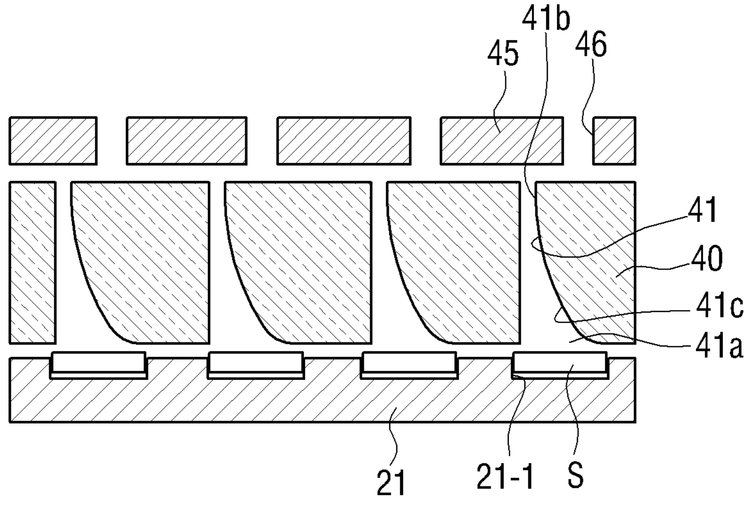
FIG. 16 is a partially sectional view conceptually illustrating a relationship of a horizontal arraying pallet, a posture changing pallet, and an open-close shutter when the horizontal arraying pallet is coupled to the reversing device.

After the horizontal arraying pallet 21 is placed at the pallet loading portion 26, the controller 90 controls the first loader 60 so that the reversing device 30 of the first loader 60 is coupled to the horizontal arraying pallet 21 (S23). In other words, the first loader 60 uses the first X axis unit 61 and first Y axis unit 62 to position the reversing device 30 above the pallet loading portion 26. After that, using the first Z axis unit 63, the reversing device 30 is lowered so that the exposed surface of the posture changing pallet 40 of the reversing device 30 contacts the horizontal arraying pallet 21. Then, the pallet fixing portion 36 operates to allow the horizontal arraying pallet 21 to be fixed to the posture changing pallet 40. When the horizontal arraying pallet 21 is coupled with the posture changing pallet 40, the elongated grooves 21-1 of the horizontal arraying pallet 21 are aligned with the inlet portions 41*a* of the posture changing holes 41 of the posture changing pallet 40 and the blocking portion 47 of the open-close shutter 45 blocks the outlet portions 41*b* of the posture changing holes 41. FIG. 16 conceptually illustrates relationship among the elongate grooves 21-1, posture changing holes 41 and through holes 46 of each of the horizontal arraying pallet 21, posture changing pallet 40 and open-close shutter 45. Then, the first loader 60 lifts the reversing device 30 and rotates the reversing frame 31 by 180 degrees (S25). After the reversing frame 31 is rotated by 180 degrees, as illustrated in FIG. 17, the open-close shutter 45 faces downward. At this time, the spacers S received in the elongated grooves 21-1 of the horizontal arraying pallet 21 pass through the inlet portions 41*a* and curved portions 41*c* of the posture changing holes 41 of the posture changing pallet 40 and are placed in a vertical state at the outlet portions 41*b* of the posture changing holes 41 which are blocked by the blocking portions 47 of the open-close shutter 45.

Figure 19:
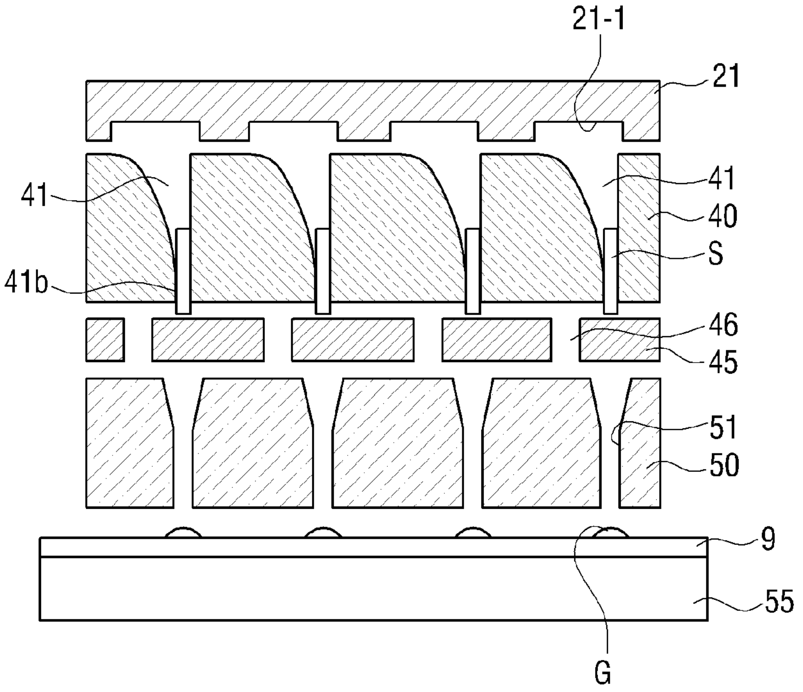
FIG. 19 is a partially sectional view conceptually illustrating a state in which the reversing device of FIG. 17 is located above the inserting guide of FIG. 18.
Figure 20:
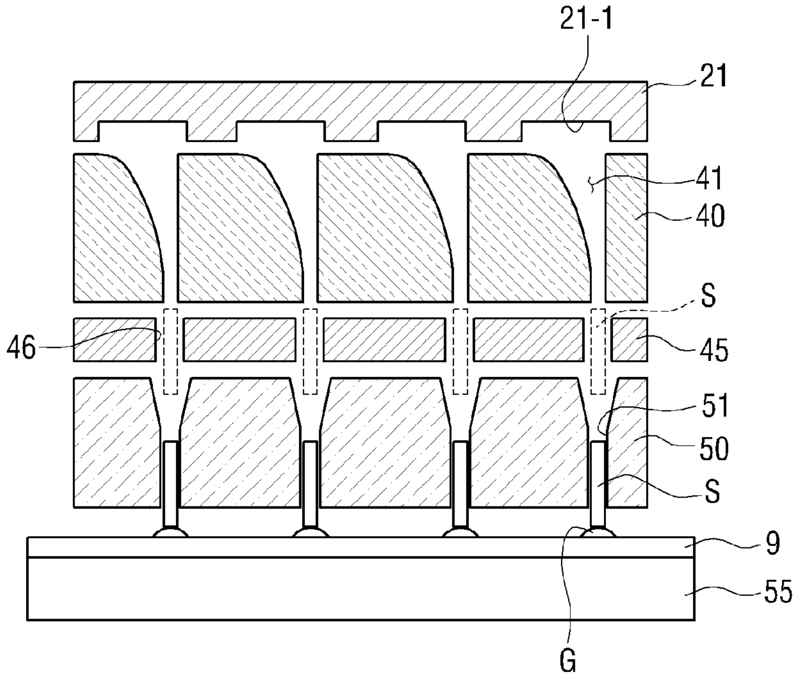
FIG. 20 is a partially sectional view conceptually illustrating a state in which an open-close shutter of the reversing device operates so that spacers are adhered to the panel through the inserting guide.
Figure 21:
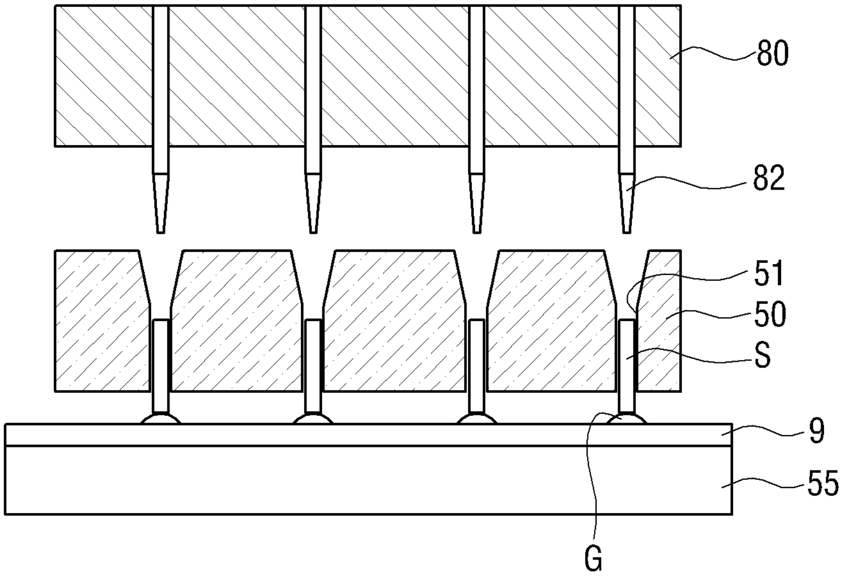
FIG. 21 is a partially sectional view conceptually illustrating a state in which a pressing chuck is located above the inserting guide after the revering device is moved.
Figure 22:
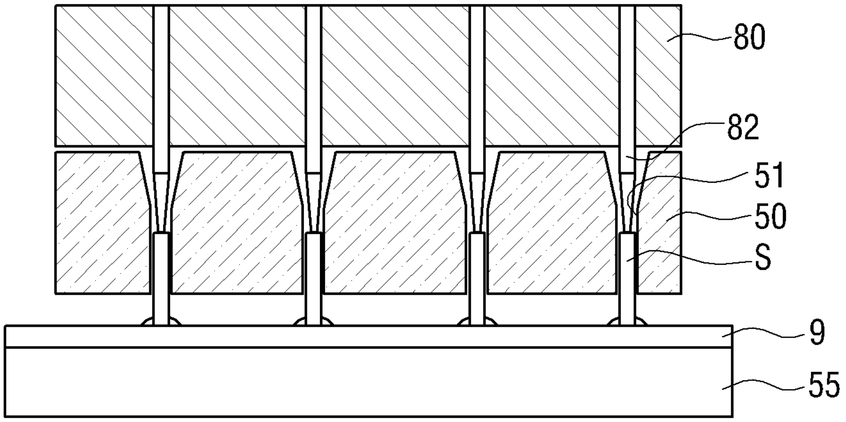
FIG. 22 is a partially sectional view conceptually illustrating a state in which the pressing chuck moves downward to press spacers against the panel.
Figure 23:
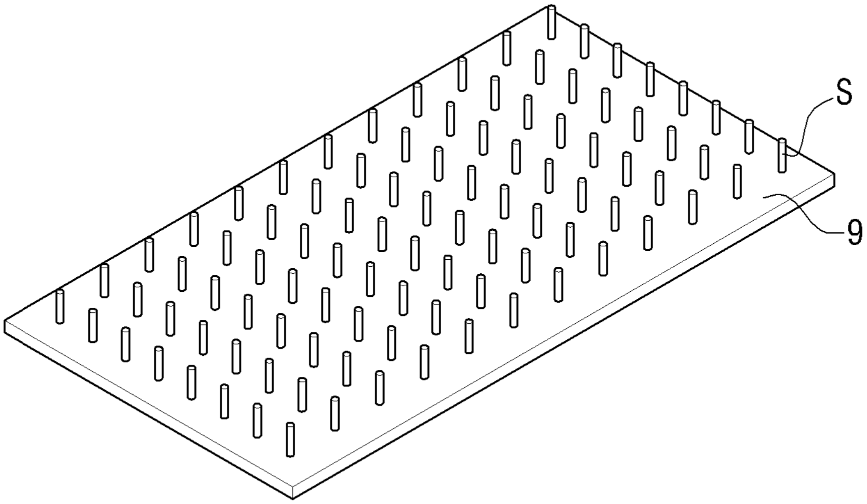
FIG. 23 is a perspective view conceptually illustrating a panel on which spacers are mounted.

In this state, the first loader 60 carries the reversing device 30 above the inserting guide 50 below which the panel 9 is loaded (S27) as illustrated in FIG. 18. At this time, since the posture changing pallet 40 receives all spacers S that will be used in one panel 9 in an area corresponding to ¼ of the panel 9, the first loader 60 allows the reversing device 30 to be located above a inserting guide part (a first part) P1 corresponding to one of the four equal parts 9-1, 9-2, 9-3 and 9-4 of the panel 9. After that, when lowering the first Z axis unit 63 of the first loader 60, the reversing device 30 is lowered so that the open-close shutter 45 is placed nearly above the first part of the inserting guide 50. At this time, as illustrated in FIG. 19, the outlet portions 41*b* of the posture changing holes 41 of the posture changing pallet 40 are aligned with the guiding holes 51 of the inserting guide 50 in a straight line. Then, the controller 90 operates the open-close shutter 45 so that the through holes 46 are placed below the outlet portions 41*b* of the first posture changing holes A'1 of the posture changing hole groups (see FIG. 14) (S29). As a result, the spacers S in the outlet portions, by force of gravity, pass the through hole 46, are inserted into the guiding holes 51 of the inserting guide 50 as illustrated in FIG. 20, and are attached to the glue spots G on the panel 9.

After that, the controller 90 moves the first loader 60 so that the reversing device 30 is placed above a second part P2 of the inserting guide 50. After that, the open-close shutter 45 is moved so that the through holes 46 are placed below the outlet portions 41*b* of the second posture changing holes A'2 (see FIG. 14). Then, the plurality of spacers S placed in the outlet portions 41*b* of each of the plurality of second posture changing holes 41 of the posture changing pallet 40 fall down to be attached to the panel 9.

Next, the controller 90 again moves the first loader 60 so that the reversing device 30 is moved above a third portion P3 of the inserting guide 50. After that, the open-close shutter 45 is moved so that the through holes 46 are placed below the outlet portions 41*b* of the third posture changing holes A'3 (see FIG. 14). Then, the plurality of spacers S placed in the outlet portions 41*b* of each of the plurality of third posture changing holes A'3 of the posture changing pallet 40 fall down to be attached to the panel 9.

Finally, the controller 90 again moves the first loader 60 so that the reversing device 30 is moved above a fourth portion P4 of the inserting guide 50. After that, the open-close shutter 45 is moved so that the through holes 46 are placed below the outlet portions 41*b* of the fourth posture changing holes A'4 (see FIG. 14). Then, the plurality of spacers S placed in the outlet portion 41*b* of each of the plurality of fourth posture changing holes A'4 of the posture changing pallet 40 fall down to be attached to the panel 9.

Meanwhile, while the first loader 60 inserts the spacers S into the third and fourth parts P3 and P4 of the inserting guide 50, the controller 90 moves the second loader 70 so that the pressing chuck 80 is placed above the first and second parts P1 and P2 of the inserting guide 50. After that, when the second loader 70 lowers the pressing chuck 80, the pressing pins 82 are inserted into the guiding holes 51 of the first and second parts of the inserting guide 50 to press the spacers S therein (S33). Then the spacers S are completely attached to the glue G of the panel 9 by the pressing force of the pressing pin 82. After that, the second loader 70 lifts and moves the pressing chuck 80 above the third and fourth parts P3 and P4 of the inserting guide 50 in which the spacers S are completely inserted by the first loader 60. Then the pressing chuck 80 is lowered to press the spacers S inserted in the guiding holes 51 of the third and fourth parts P3 and P4 of the inserting guide 50. After that, the second loader 70 lifts the pressing chuck 80 to be returned to the original position. After the pressing chuck 80 is lifted, the controller 90 operates the panel carrying unit 5 to unload the panel on which the spacers S are mounted from the working table 55 (S35) and to load a new panel on which glue G is sprayed onto the working table 55. If there is no panel carrying unit 5, the controller 90 displays a signal of working completion. Then a worker may unload the panel 9 on which the spacers S are mounted and load a new panel 9.

The automatic spacers mounting apparatus 3 may be formed to detect whether the spacers S are normally inserted in the guiding holes 51 of the inserting guide 50 by using a vision sensor (not illustrated) before the pressing chuck 80 presses the spacers S of the first and second parts P1 and P2 and before the pressing chuck 80 presses the spacers S of the third and fourth parts P3 and P4, and then, to discharge spacers S that are not inserted in the guiding holes 51.

After completing insertion of the spacers S into the first, second, third and fourth parts P1, P2, P3 and P4, the first loader 60 unloads an empty horizontal arraying pallet 21 to a pallet unloading portion 27. After that, the first loader moves to the pallet loading portion 26 and couples a new horizontal arraying pallet 21 with spacers S to the reversing device 30. After that, the controller 90 repeats operations as described above to mount the spacers S on the panel 9.

As described above, with an automatic spacers mounting system according to an exemplary embodiment, since glue is directly sprayed on a panel, a process in which the glue is sprayed on the panel and a process in which spacers are mounted on the panel can be performed in the same time.

Also, with an automatic spacers mounting system according to an exemplary embodiment, many spacers, for example, all of the spacers or at least ¼ of the spacers required for one panel can be mounted on the panel at one time. Therefore, a working time for mounting spacers on the panel may be reduced as compared to a related art automatic spacers mounting system.

While exemplary embodiments have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the inventive concept.

What is claimed is:

1. An automatic spacers mounting system comprising:

a horizontal arraying device which is configured to hold a plurality of spacers in a horizontal position in a horizontal arraying pallet;

a reversing device comprising a posture changing pallet and an open-close shutter, wherein the reversing device couples the posture changing pallet and the open-close shutter to the horizontal arraying pallet, such that the posture changing pallet faces the horizontal arraying pallet, and rotates the coupled posture changing pallet, the coupled open-close shutter, and the coupled horizontal arraying pallet by 180 degrees;

an inserting guide comprising a plurality of guiding holes;

a working table which is disposed below the inserting guide, and is configured to hold a panel on which glue is sprayed;

a first loader which positions the reversing device above the inserting guide;

a pressing chuck comprising a plurality of pressing pins corresponding to the plurality of guiding holes of the inserting guide; and a second loader which positions the pressing chuck above the inserting guide and inserts the plurality of pressing pins into the plurality of guiding holes.

2. The automatic spacers mounting system of claim 1, further comprising a controller which controls the reversing device, the first loader, and the second loader.

3. The automatic spacers mounting system of claim 1, wherein the horizontal arraying pallet comprises a plurality of elongated grooves, formed at a predetermined interval, configured to hold the plurality of spacers in a horizontal position.

4. The automatic spacers mounting system of claim 1, wherein the horizontal arraying device is configured to move the horizontal arraying pallet in a seesaw motion and to apply a vibration to the horizontal arraying pallet.

5. The automatic spacers mounting system of claim 1, wherein the reversing device comprises a reversing frame in which the posture changing pallet and the open-close shutter are layered; and a rotating unit which rotates the reversing frame.

6. The automatic spacers mounting system of claim 5, wherein the reversing frame comprises pallet fixing portions which hold the horizontal arraying pallet to the posture changing pallet and a shutter driving portion which moves the open-close shutter with respect to the posture changing pallet.

7. The automatic spacers mounting system of claim 2, wherein the posture changing pallet comprises a plurality of posture changing holes, and wherein each of the posture changing holes comprises an inlet portion having a shape corresponding to a shape of one of the plurality of spacers in the horizontal position, an outlet portion having a shape corresponding a shape of one of the plurality of spacers in a vertical position and a curved portion connecting the inlet portion and the outlet portion to guide one of the plurality of spacers from the horizontal position to the vertical position.

8. The automatic spacers mounting system of claim 7, wherein the open-close shutter comprises a plurality of blocking portions corresponding to the outlet portions of the plurality of posture changing holes of the posture changing pallet and a plurality of through holes disposed adjacent to each of the plurality of blocking portions, and wherein according to a signal from the controller, the open-close shutter is moved such that the blocking portions or the through holes are located below the outlet portions of the posture changing holes.

9. The automatic spacers mounting system of claim 1, wherein a top end of each of the plurality of guiding holes of the inserting guide is funnel-shaped.

10. The automatic spacers mounting system of claim 1, wherein each of the plurality of pressing pins comprises a spring pin.

11. The automatic spacers mounting system of claim 1, wherein the horizontal arraying pallet is configured to hold a number of spacers corresponding to ¼ of a number of spacers to be mounted on the panel.

12. The automatic spacers mounting system of claim 1, further comprising:

a panel carrying unit which automatically loads the panel onto the working table and automatically unloads the panel from the working table.

13. The automatic spacers mounting system of claim 10, further comprising:

a glue dispensing apparatus which is disposed at a side of the panel carrying unit and sprays glue onto panel at a plurality of positions corresponding to positions at which the plurality of spacers are mounted on the panel.

14. A method of automatically mounting spacers, the method comprising:

spraying glue onto a plurality of positions on a panel;

loading the panel onto a working table below an inserting guide of an automatic spacers mounting apparatus;

horizontally positioning a plurality of spacers onto a horizontal arraying pallet;

coupling the horizontal arraying pallet to a posture changing pallet;

rotating the horizontal arraying pallet and the posture changing pallet by 180 degrees, thereby moving the plurality of spacers from horizontal positions to vertical positions;

disposing the posture changing pallet above an inserting guide disposed above the panel; and allowing the plurality of spacers to fall through a plurality of guiding holes of the inserting guide onto the glue on the plurality of positions on the panel pressing the plurality of spacers to the panel.

15. The method of automatically mounting spacers of claim 14, wherein the spraying the glue and the horizontally positioning the plurality of spacers are simultaneously performed.

16. The method of automatically mounting spacers of claim 14, wherein the rotating the horizontal arraying pallet and the posture changing pallet by 180 degrees comprises moving the plurality of spacers from horizontal positions to vertical positions through a plurality of posture changing holes of the posture changing pallet.

17. The method of automatically mounting spacers of claim 14, wherein the inserting guide comprises a first part, a second part, a third part, and a fourth part, and disposing the posture changing pallet above the inserting guide comprises disposing the posture changing pallet above the first part, the second part, the third part, and the fourth part, respectively.

18. An automatic spacers mounting system comprising:

a horizontal arraying pallet configured to hold each of a plurality of spacers in a horizontal position in one of a plurality of elongated grooves formed in an upper surface of the horizontal arraying pallet;

a posture changing pallet comprising a plurality of posture changing holes corresponding to the plurality of elongated grooves, wherein each of the posture changing holes comprises an inlet portion at an upper surface of the posture changing pallet, having a shape corresponding to a shape of one of the plurality of elongated grooves, an outlet portion at a lower surface of the posture changing pallet having an inner circumference corresponding to a shape of one of the plurality of spacers in a vertical position, and a curved portion which connects the inlet portion to the outlet portion and which is configured to guide one of the plurality of spacers from a horizontal position in the inlet portion to a vertical position in the outlet portion;

an inserting guide comprising a plurality of guiding holes corresponding to the plurality of posture changing holes;

a shutter comprising a plurality of through holes corresponding to the plurality of guiding holes;

means for coupling the shutter to the posture changing pallet and the posture changing pallet to the horizontal arraying pallet such that the posture changing pallet is disposed above the horizontal arraying pallet, the shutter is disposed above the posture changing pallet, and the upper surface of the posture changing pallet contacts the upper surface of the horizontal arraying pallet;

means for rotating the shutter, the posture changing pallet, and the horizontal arraying pallet by 180 degrees such that the plurality of spacers disposed the plurality of elongated grooves of the horizontal arraying pallet fall through inlet portions and curved portions of the plurality of posture changing holes into outlet portions of the plurality of posture changing holes;

means for positioning the posture changing pallet and the shutter above a panel; and means for moving the shutter to an open position in which positions of the plurality of through holes of the shutter correspond to positions of the plurality of posture changing holes of the posture changing pallet, such that the plurality of spacers disposed in outlet portions of the plurality of posture changing holes fall through the plurality of through holes onto the panel.

19. A method of automatically mounting spacers on a panel, the method comprising:

arranging a plurality of spacers into horizontal positions in a plurality of elongated grooves formed in an upper surface of a horizontal arraying pallet;

coupling an upper surface of a posture changing pallet to the upper surface of the horizontal arraying pallet, wherein the posture changing pallet comprises:

a plurality of posture changing holes corresponding to the plurality of elongated grooves, wherein each of the posture changing holes comprises an inlet portion at the upper surface of the posture changing pallet, having a shape corresponding to a shape of one of the plurality of elongated grooves, an outlet portion at a lower surface of the posture changing pallet having an inner circumference corresponding to a shape of one of the plurality of spacers in a vertical position, and a curved portion which connects the inlet portion to the outlet portion and which is configured to guide one of the plurality of spacers from a horizontal position in the inlet portion to a vertical position in the outlet portion;

coupling a shutter to the lower surface of the posture changing pallet, wherein the shutter comprises a plurality of through holes corresponding to the plurality of posture changing holes;

rotating the shutter, the posture changing pallet, and the horizontal arraying pallet by 180 degrees such that the plurality of spacers disposed in the plurality of elongated grooves of the horizontal arraying pallet fall through inlet portions and curved portions of the plurality of posture changing holes into outlet portions of the plurality of posture changing holes;

positioning the posture changing pallet and the shutter above a panel; and moving the shutter to an open position in which positions of the plurality of through holes of the shutter correspond to positions of the plurality of posture changing holes of the posture changing pallet, such that the plurality of spacers disposed in the outlet portions of the plurality of posture changing holes fall through the plurality of through holes onto the panel.

* * * * *